(12) United States Patent
Sato (10) Patent No.: US 7,772,727 B2
(45) Date of Patent: Aug. 10, 2010

(54) PLANAR PULSE MOTOR, EXPOSURE APPARATUS, AND DEVICE MANUFACTURING METHOD

(75) Inventor: Mitsuya Sato, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 154 days.

(21) Appl. No.: 12/182,973

(22) Filed: Jul. 30, 2008

(65) Prior Publication Data

US 2009/0033158 A1  Feb. 5, 2009

(30) Foreign Application Priority Data

Aug. 1, 2007  (JP)  ............... 2007-201100
Jul. 2, 2008  (JP)  ............... 2008-173888

(51) Int. Cl.
*H02K 41/02* (2006.01)

(52) U.S. Cl. ............... 310/12.05; 310/12.17; 310/12.24

(58) Field of Classification Search ............. 310/12.01, 310/12.05, 12.15, 12.17, 12.21, 12.24, 12.25; 355/53, 72
See application file for complete search history.

(56) References Cited

U.S. PATENT DOCUMENTS

| | | | | |
|---|---|---|---|---|
| 6,114,781 | A * | 9/2000 | Hazelton et al. | ......... 310/12.29 |
| 6,144,119 | A * | 11/2000 | Hazelton | ............. 310/12.06 |
| 6,188,147 | B1 * | 2/2001 | Hazelton et al. | ......... 310/12.06 |
| 6,522,035 | B1 * | 2/2003 | Smit | ...................... 310/12.18 |
| 6,987,335 | B2 * | 1/2006 | Korenaga | ............. 310/12.15 |
| 7,170,203 | B2 * | 1/2007 | Cheung et al. | .......... 310/12.18 |
| 7,227,284 | B2 * | 6/2007 | Korenaga | ............. 310/12.25 |
| 7,245,047 | B2 * | 7/2007 | Vreugdewater et al. | .. 310/12.07 |
| 2002/0105237 | A1 * | 8/2002 | Itoh et al. | ................... 310/12 |
| 2004/0007920 | A1 * | 1/2004 | Teng | ........................ 310/12 |
| 2004/0263000 | A1 * | 12/2004 | Vreugdewater et al. | ...... 310/12 |

FOREIGN PATENT DOCUMENTS

JP   51-35010   6/1993

* cited by examiner

*Primary Examiner*—Thanh Lam
(74) *Attorney, Agent, or Firm*—Canon USA Inc IP Div

(57) ABSTRACT

A planar pulse motor includes a stator and a mover which is arranged opposite to the stator and which has a plurality of coils. The planar pulse motor can drive the mover in a first direction on a horizontal plane and in a second direction orthogonal to the first direction by controlling current flowing in the plurality of coils. The stator has a plurality of raised portions, including a plurality of first raised portions composed by laminating a plurality of layers of members including magnetic materials through which magnetic flux can pass only in the first direction and a plurality of second raised portions composed by laminating a plurality of layers of members including magnetic materials through which magnetic flux can pass only in the second direction, and a plurality of recessed portions through which magnetic flux does not pass in either the first or the second direction. The plurality of raised portions are regularly arranged in a vicinity of each of recessed portions in the first and second directions.

11 Claims, 12 Drawing Sheets

SECOND PRODUCTION STEP

FIRST PRODUCTION STEP

FIG.5B

SECOND PRODUCTION STEP

PLANAR PULSE MOTOR, EXPOSURE APPARATUS, AND DEVICE MANUFACTURING METHOD

BACKGROUND OF THE INVENTION

1. Field of the Invention

The present invention relates to a planar pulse motor, an exposure apparatus, and a device manufacturing method.

2. Description of the Related Art

Figure 6:
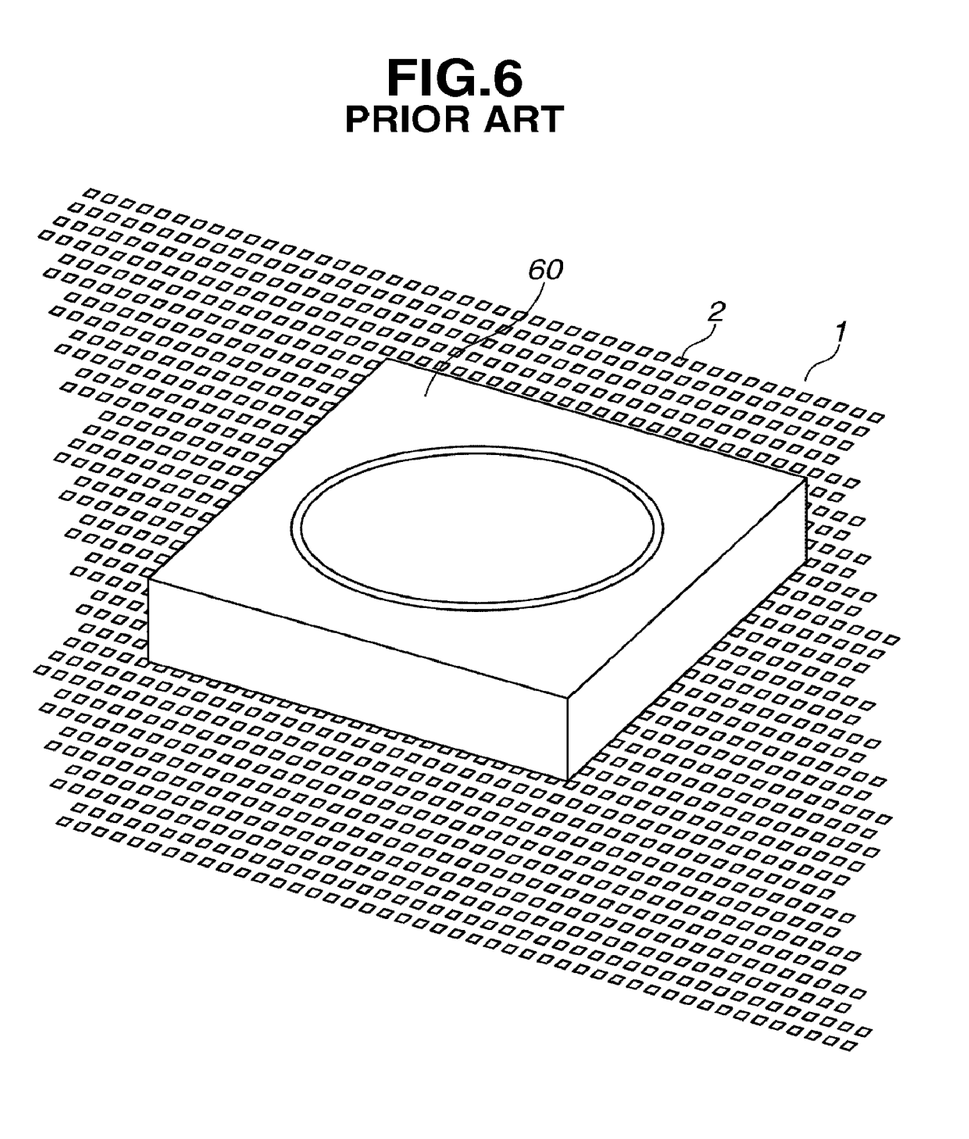
FIG. 6 is a perspective view illustrating the structure of a conventional planar pulse motor.
Figure 7:
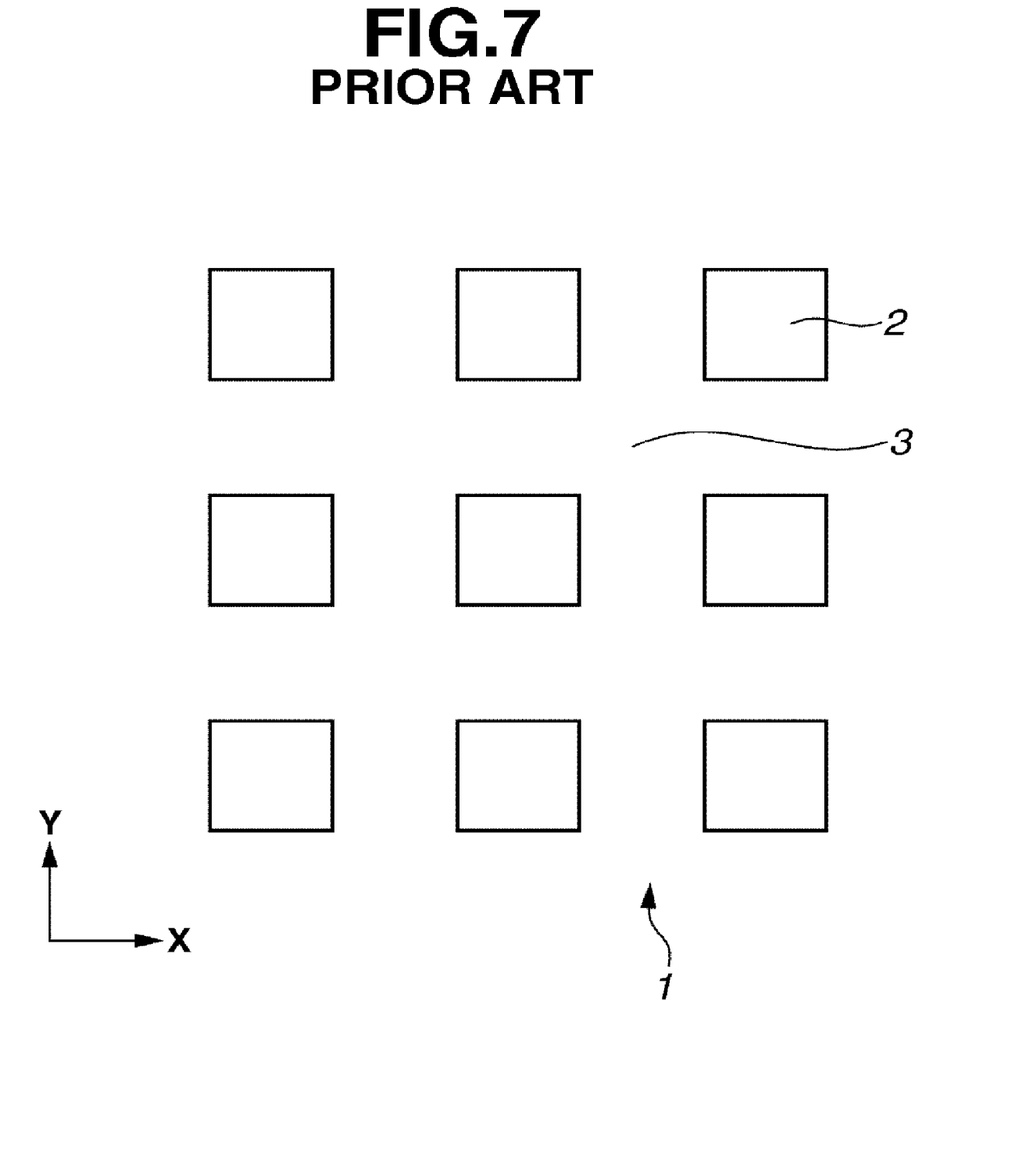
FIG. 7 is a view illustrating the structure of the stator illustrated in FIG. 6.

FIGS. 6 and 7 illustrate the structure of a conventional planar pulse motor. A mover 60 can move in X and Y directions while floating in air, for example, 20 micrometers above a stator 1. As illustrated in FIG. 7, the stator 1 of a conventional planar pulse motor is configured from rows on which raised portions 2 and recessed portions 3 are arranged alternately in the Y direction, and rows on which only recessed portions 3 and no raised portions 2, are arranged in the Y direction. The two kinds of rows are provided alternately in the X direction. The raised portions 2 are regions which allow magnetic flux to pass through in both the X and Y directions. The recessed portions 3 are regions which do not allow magnetic flux to pass through in either the X or the Y direction.

In a conventional planar pulse motor, the dimension ratio between raised portions 2 and recessed portions 3 of the stator 1 is usually about 1 to 1. Therefore, the area ratio of the raised portions 2 on the surface of the stator 1 is about 1/4. Thus, in a conventional planar pulse motor, a pass area through which the magnetic flux flows into the raised portions 2 of the stator 1 from the tooth tips of the mover 60 is about ½ that of a single axis linear pulse motor, so that the utilization efficiency of the magnetic flux is low. Therefore, it is difficult to obtain a high thrust in a conventional planar pulse motor.

SUMMARY OF THE INVENTION

The present invention is directed to a planar pulse motor having a greater pass area through which magnetic flux flows and having improved thrust.

According to an aspect of the present invention, a planar pulse motor includes a stator and a mover having a plurality of coils which is arranged opposite to the stator, wherein the planar pulse motor is operable to drive the mover in a plane in first direction and in a second direction, orthogonal to the first direction. The stator includes a plurality of raised portions, the raised portions comprising at least two different types, the different types being selected from the group consisting of first raised portions formed by laminating a plurality of layers of members including magnetic materials through which magnetic flux can pass only in the first direction, second raised portions formed by laminating a plurality of layers of members including magnetic materials through which magnetic flux can pass only in the second direction and third raised portions through which magnetic flux can pass in both the first and second directions. The stator further includes a plurality of recessed portions through which magnetic flux cannot pass in either the first or the second direction, and the plurality of raised portions are regularly arranged next to each of the plurality of recessed portions in the first and second directions.

According to another aspect of the present invention, a stator for use in a planar pulse motor includes a plurality of raised portions, the raised portions comprising at least two different types, the different types being selected from the group consisting of first raised portions composed by laminating a plurality of layers of members including magnetic materials through which magnetic flux can pass only in a first direction, second raised portions composed by laminating a plurality of layers of members including magnetic materials through which magnetic flux can pass only in a second direction orthogonal to said first direction and third raised portions through which magnetic flux can pass in both the first and second directions. The stator further including a plurality of recessed portions through which magnetic flux cannot pass in either the first or the second direction, and the plurality of raised portions are regularly arranged next to each of the plurality of recessed portions in the first and second directions.

Further features and aspects of the present invention will become apparent from the following detailed description of exemplary embodiments with reference to the attached drawings.

BRIEF DESCRIPTION OF THE DRAWINGS

The accompanying drawings, which are incorporated in and constitute a part of the specification, illustrate exemplary embodiments, features, and aspects of the invention and, together with the description, serve to explain the principles of the invention.

DETAILED DESCRIPTION OF THE EMBODIMENTS

Various exemplary embodiments, features, and aspects of the invention will be described in detail below with reference to the drawings.

First Exemplary Embodiment

The planar pulse motor according to an exemplary embodiment of the present invention includes a stator and a mover which is arranged opposite to the stator (i.e. facing the stator) and which has a plurality of coils. The mover can move in a first direction and in a second direction orthogonal to the first direction (both directions on the same plane) as a result of the current flowing in the plurality of coils being controlled. In the present exemplary embodiment the first direction is the X direction and the second direction is the Y direction.

Figure 1:
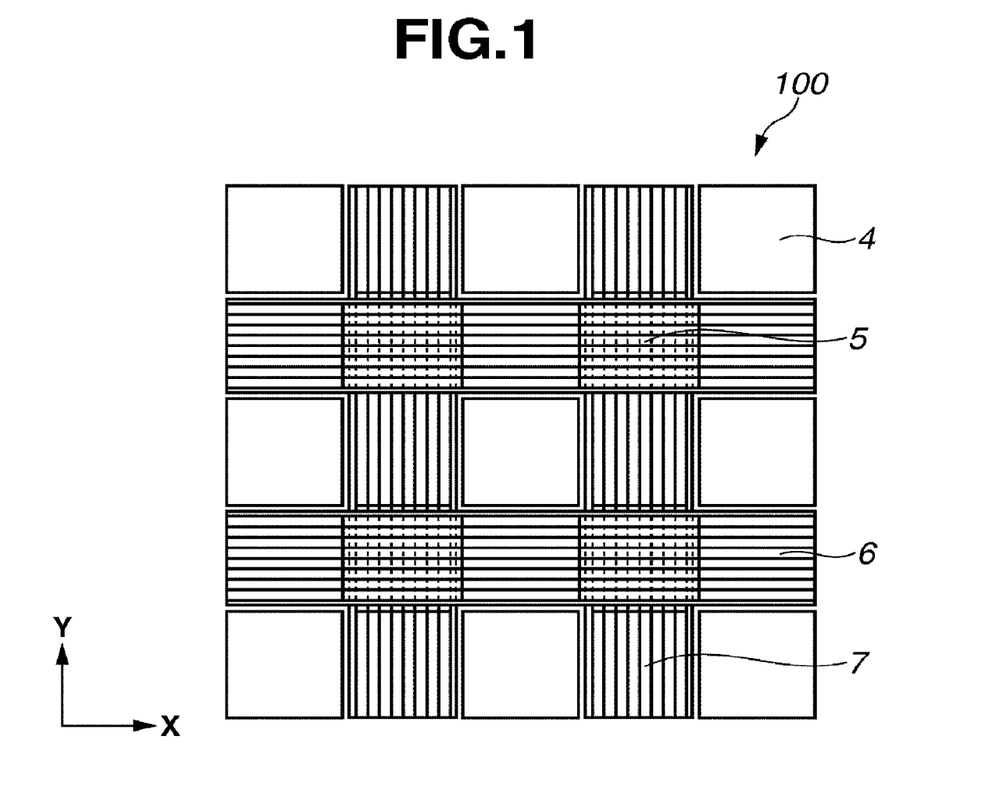
FIG. 1 is a view illustrating an example of a stator according to a first exemplary embodiment of the present invention.

FIG. 1 illustrates an example of a stator 100 according to a first exemplary embodiment of the present invention. Raised portions (XY) 4 are third raised regions through which magnetic flux can pass in both the X and Y directions. Recessed portions 5 are regions through which magnetic flux does not pass in either the X direction or the Y direction. Raised portions (X) 6 are first raised regions through which magnetic flux can pass only in the X direction, and raised portions (Y) 7 are second raised regions through which magnetic flux can pass only in the Y direction. The raised portions of the present exemplary embodiment include the first raised portions 6, the second raised portions 7 and the third raised portions 4. Among the eight regions surrounding a recessed portion 5, raised portions (X) 6 are positioned in the two regions adjacent in the X direction to the recessed portion 5, and raised portions (Y) 7 are positioned in the two regions adjacent in the Y direction to the recessed portion 5. In the four remaining regions corresponding to the corners of a 3×3 square, raised portions (XY) 4 are positioned. The raised portions and the recessed portions are regularly arranged in the X and Y directions so that each of the raised portions 4, 6 and 7 and the recessed portions 5 has the above-described positional relationship.

Figure 2A:
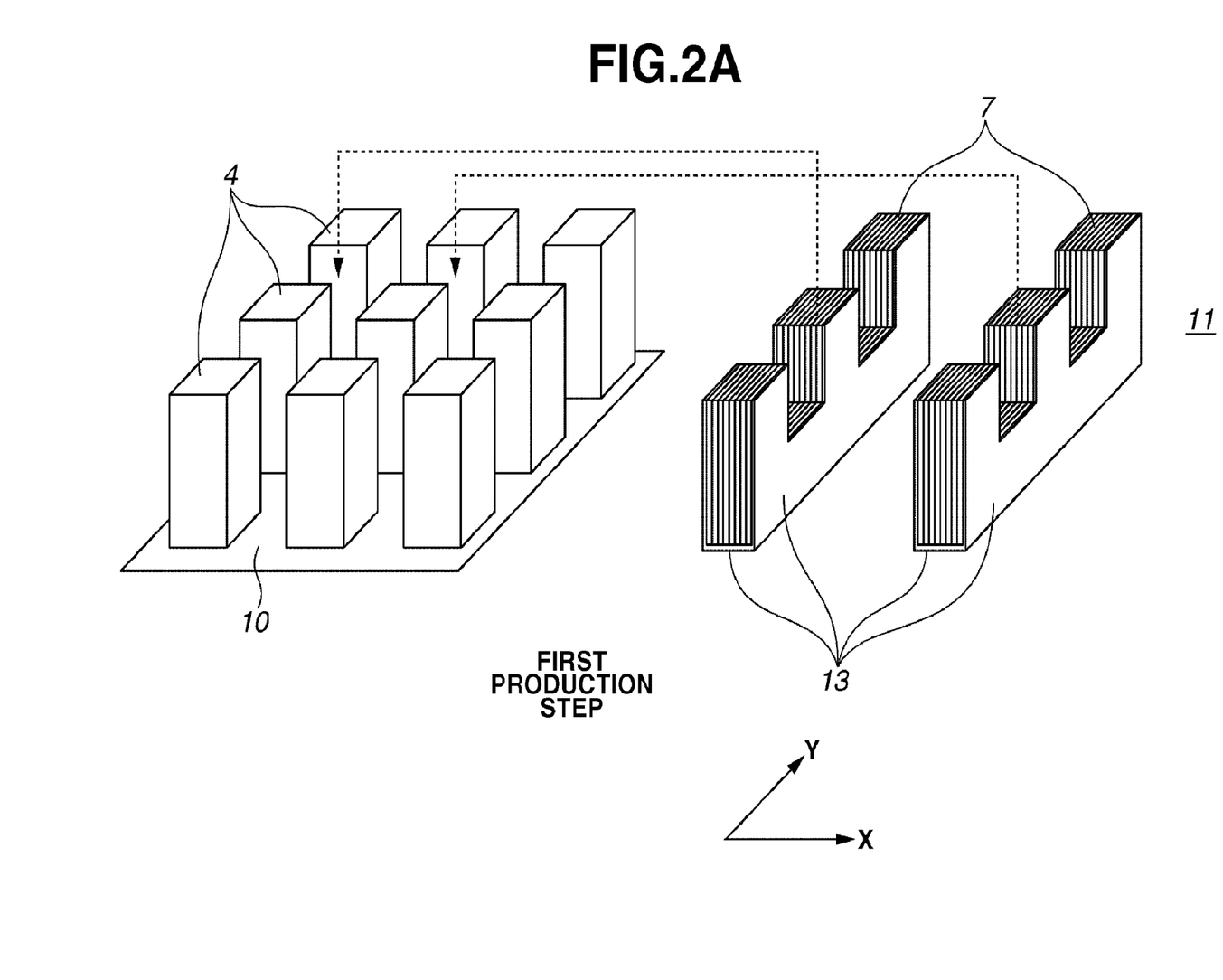
FIGS. 2A-2C are views illustrating a method for manufacturing the stator illustrated in FIG. 1.
Figure 2B:
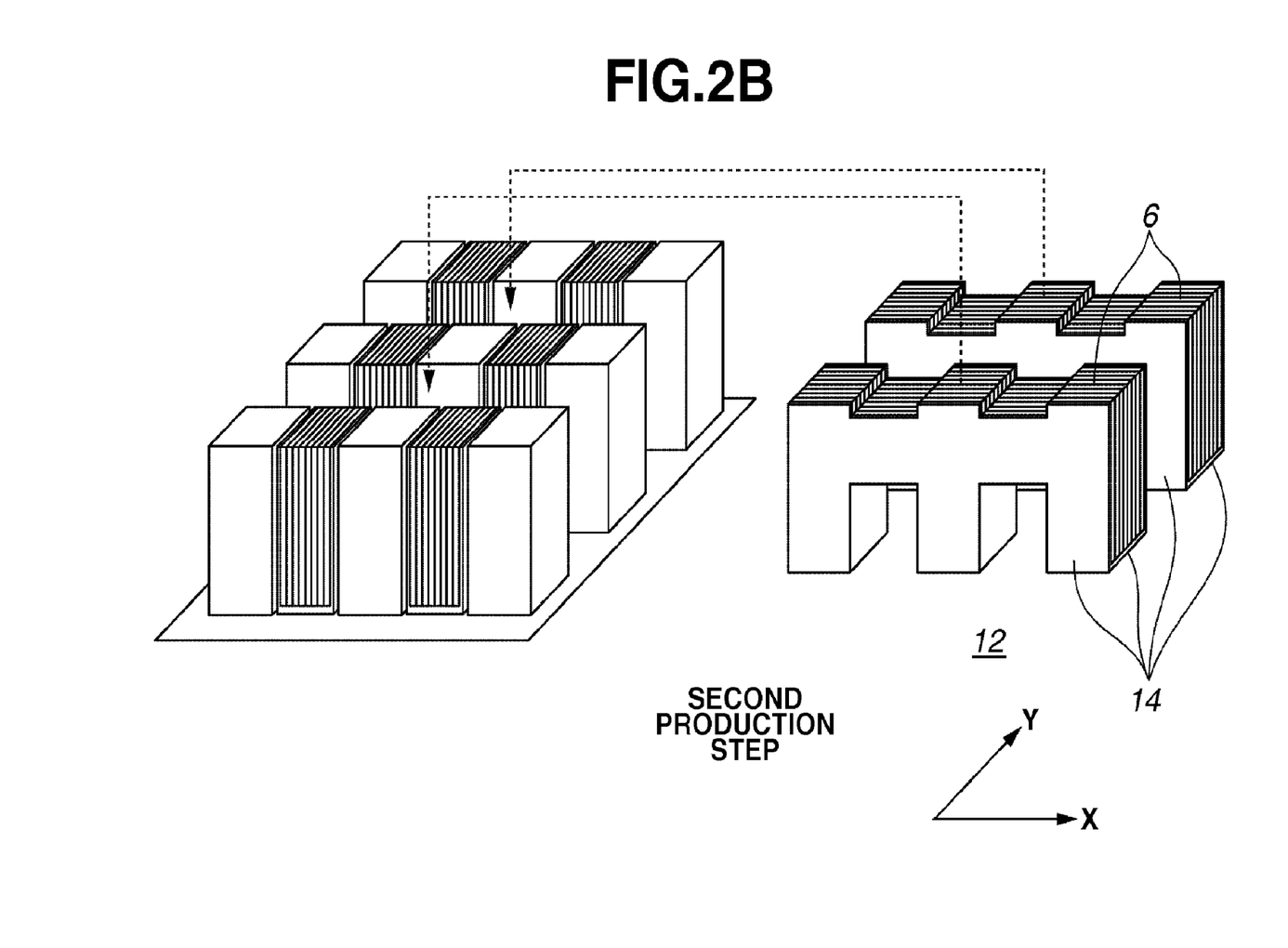
Figure 2C:
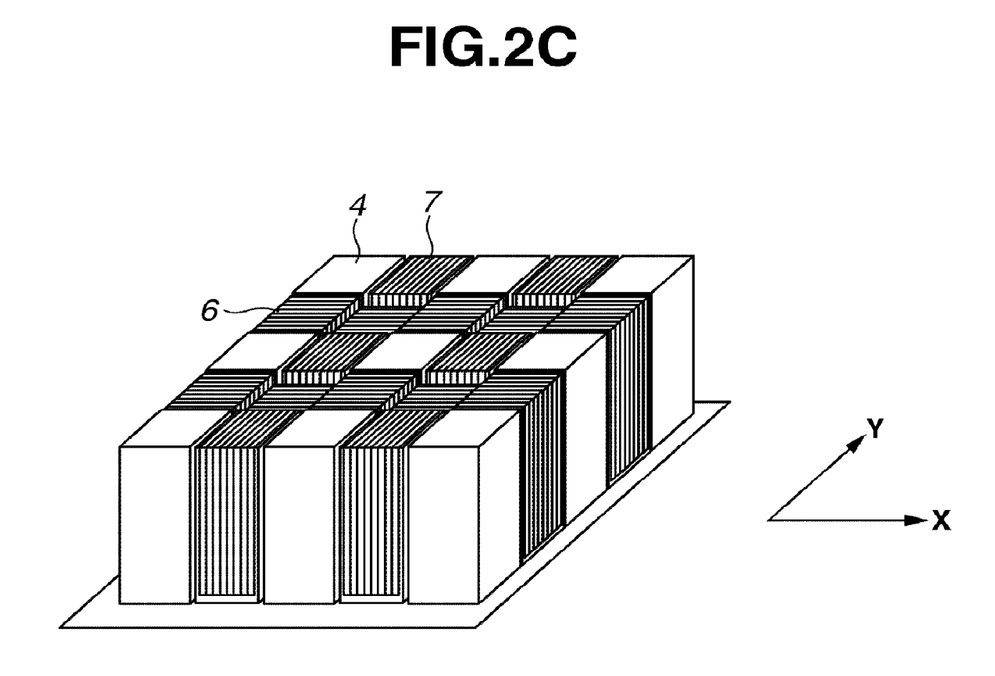

FIGS. 2A to 2C illustrate a method for manufacturing the stator 100 illustrated in FIG. 1. In a first manufacturing step, a structure is prepared in the same manner as the conventional method where the raised portions (XY) 4 are arranged on a base 10 illustrated on the left side of FIG. 2A. The raised portions (XY) 4 arranged on the base 10 are manufactured by laminating and processing a thin silicon steel plate in the same manner as a conventional stator. In this arrangement, magnetic flux can pass through the raised portions 4 in both the X and Y directions in the same manner as in the conventional raised portions 2 shown in FIGS. 6 and 7. However, since the thinner silicon steel plate is laminated in the X direction on the base 10, the magnetic flux can pass through in the Y direction easier than the X direction. Further, a different point from the conventional raised portions is that the height of the raised portions (XY) 4 is set higher than the conventional stator. Then, the plurality of raised portion (Y) blocks 11 illustrated on the right side of FIG. 2A, on which pre-manufactured raised portions (Y) 7 are formed in a line, is integrally fitted into the gaps between the structure's raised portions (XY) 4.

The raised portion (Y) blocks 11 are manufactured by laminating and processing a thin silicon steel plate in the same manner as a conventional stator, and are configured such that magnetic flux can easily pass through in the Y direction. The raised portion (Y) blocks 11 are provided with a magneto-resistive layer 13 on their sides and underside, and are structured so that magnetic flux directed to the raised portions (Y) 7 flows only in the raised portion (Y) blocks 11 in the Y direction.

The stator 100 manufactured after the first manufacturing step is illustrated on the left side of FIG. 2B. In the second manufacturing step, raised portion (X) blocks 12, on which raised portions (X) 6 and recessed portions 5 are alternately formed in a line, are fitted into the blocks illustrated on the left side of FIG. 2B to form an integrated structure. The raised portion (X) blocks 12 are also manufactured by laminating and processing a thin silicon steel plate in the same manner as a conventional stator, and are configured such that magnetic flux can easily pass through in the X direction. The raised portion (X) blocks 12 are provided with a magneto-resistive layer 14 on their side and underside, and are structured such that magnetic flux directed towards the raised portions (X) 6 flows only in the raised portion (X) blocks 12 in the X direction.

A stator manufactured after the second manufacturing step is illustrated in FIG. 2C. Then, in the same manner as the conventional stator, the stator 1 is completed by flowing resin into the recessed portions 5 to provide a flat surface.

Figure 3:
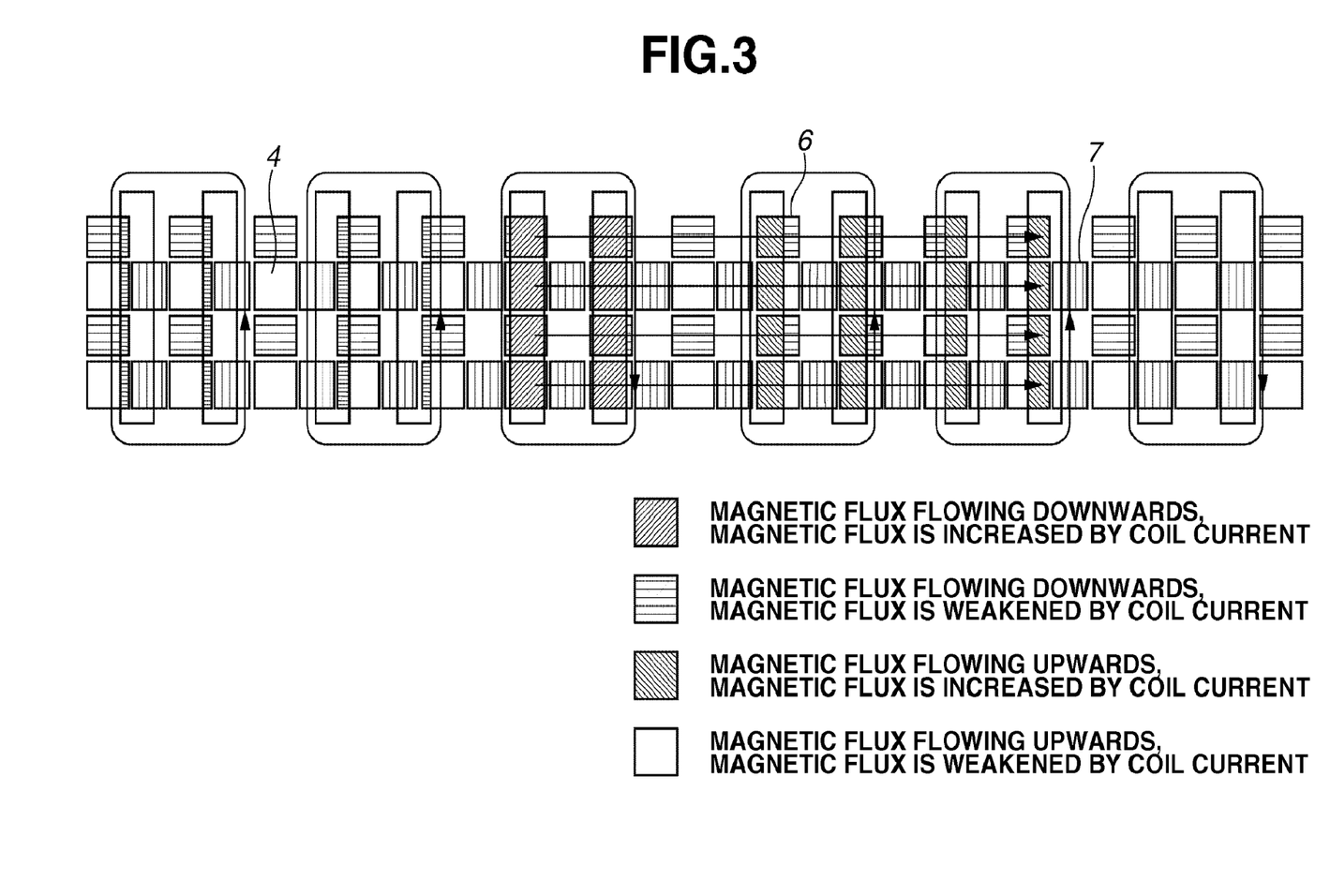
FIG. 3 is a view for describing the pass area of the stator illustrated in FIG. 1 through which magnetic flux flows.
Figure 8:
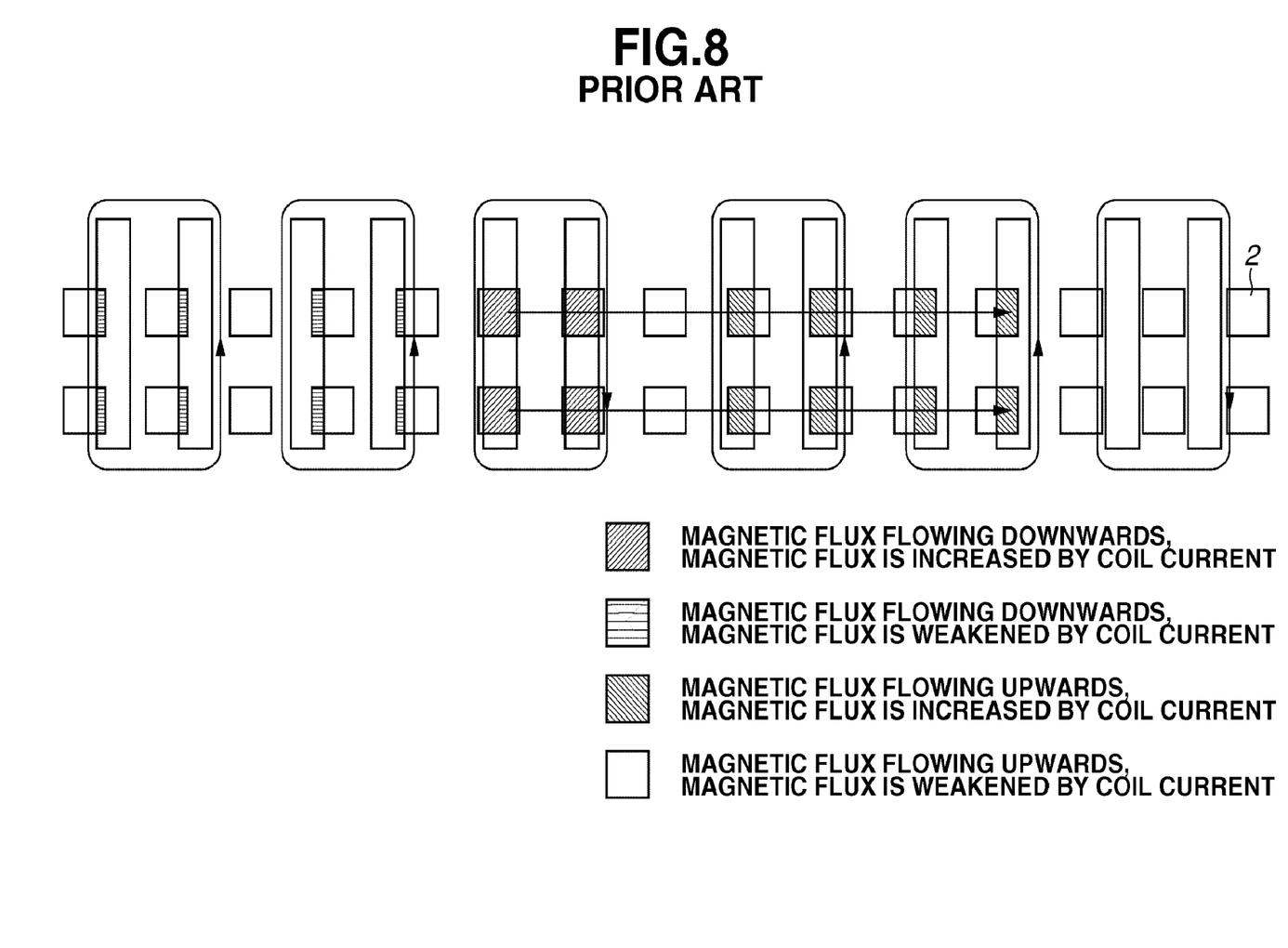
FIG. 8 is a view for describing the pass area of the stator illustrated in FIG. 6 through which magnetic flux flows.

FIG. 3 is a view describing the pass area of the stator 100 through which magnetic flux flows according to the present exemplary embodiment. FIG. 8 is a view describing the pass area of the conventional stator 1 illustrated in FIG. 6 through which magnetic flux flows. When the stator 100 according to the present exemplary embodiment is used, it can be seen that the pass area through which magnetic flux flows roughly doubles since the raised portions (X) 6 are arranged in regions which are conventionally recessed portions. Further, since the raised portions (X) 6 are configured such that the magnetic flux can easily pass through in the X direction particularly, the pass area through which magnetic flux flows can double or more in the X direction. Further, although only the X direction is illustrated in FIG. 3, it is clear from the shape that the pass area through which magnetic flux flows also roughly doubles in the Y direction as well.

Second Exemplary Embodiment

Figure 4:
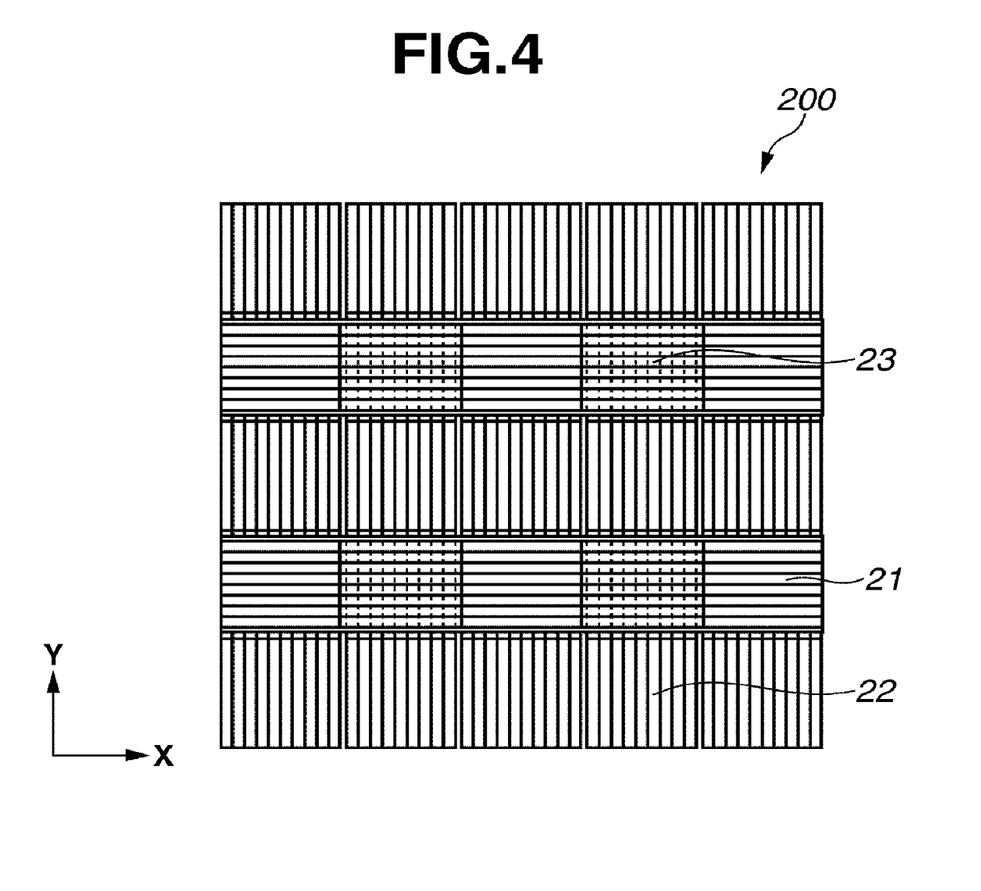
FIG. 4 is a view illustrating an example of a stator according to a second exemplary embodiment of the present invention.
Figure 5A:
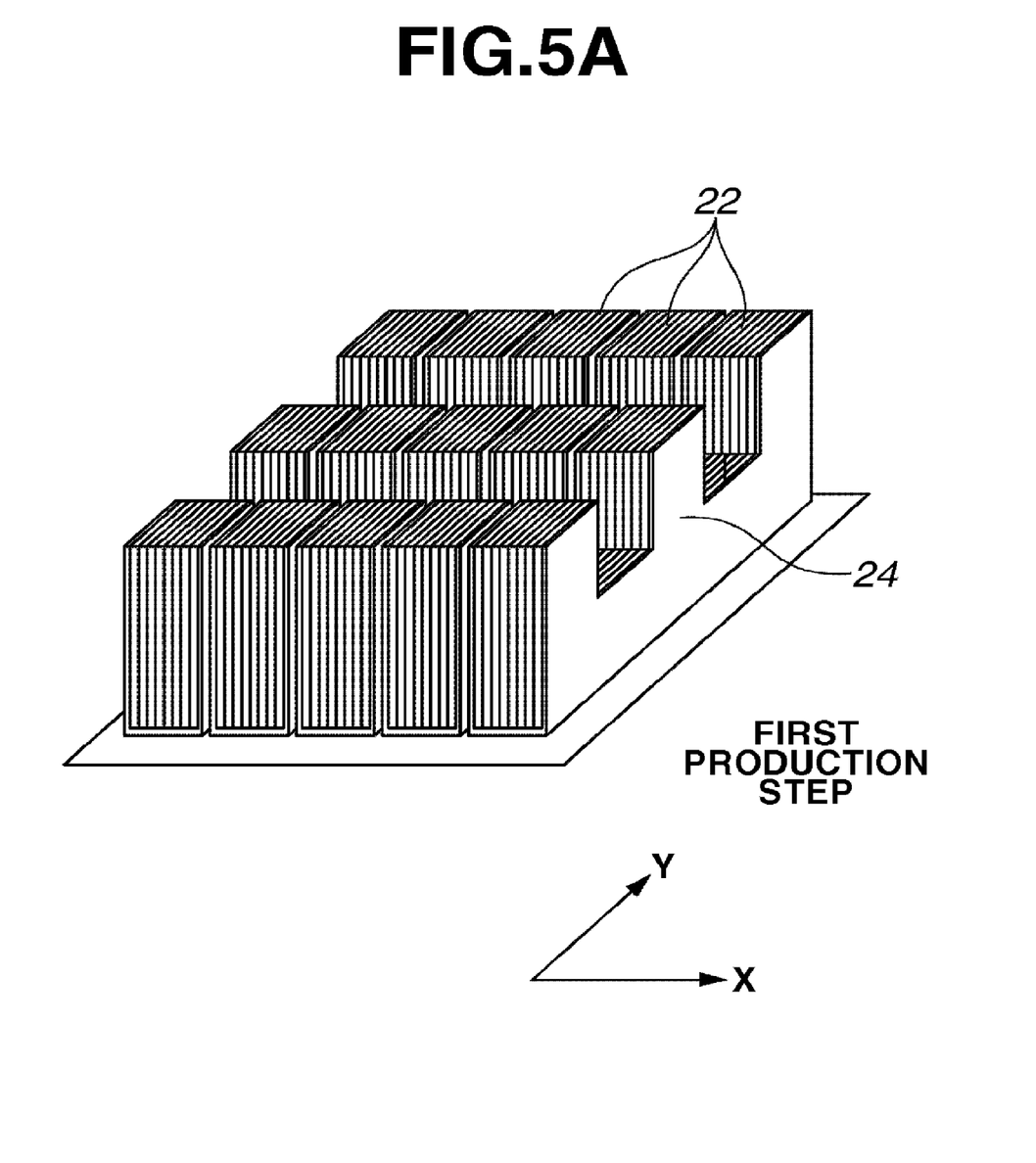
FIGS. 5A and 5B are views illustrating a method for manufacturing the stator illustrated in FIG. 4.
Figure 5B:
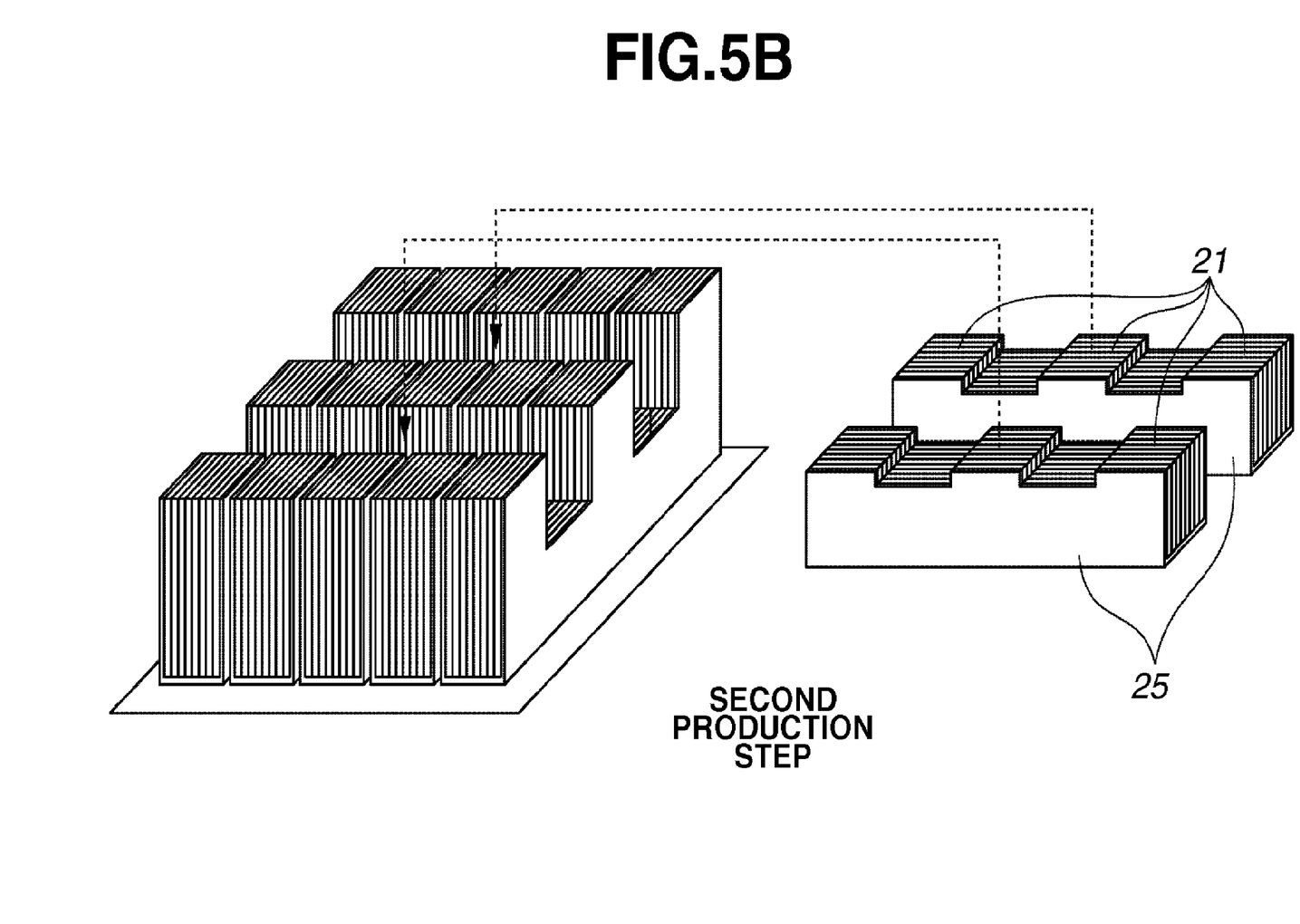

FIG. 4 illustrates an example of a stator 200 according to a second exemplary embodiment of the present invention. The raised portions (X) 21 are regions through which magnetic flux can pass only in the X direction, and the raised portions (Y) 22 are regions through which magnetic flux can pass only in the Y direction. The recessed portions 23 are regions through which magnetic flux does not pass in either the X or the Y direction. FIGS. 5A and 5B are views illustrating a method for manufacturing the stator 200 illustrated in FIG. 4. First, in a first manufacturing step illustrated in FIG. 5A, a plurality of raised portion (Y) blocks 24, on which raised portions (Y) 22 and groove portions are alternately formed, are lined up in the X direction. The blocks are bonded together and integrated to form a structure of raised portions (Y). Next, in a second manufacturing step illustrated in FIG. 5B, a plurality of raised portion (X) blocks 25, on which raised portions (X) 21 and recessed portions 23 are alternately formed in a line, are fitted into and bonded to the groove portions common to the raised portion (Y) blocks 24 to form an integrated structure. Then, in the manner of conventional art, resin is flowed into the recessed portions 23 to provide a flat surface, and the stator 200 illustrated in FIG. 4 is completed. Further, in the same manner as the first exemplary embodiment, a magneto-resistive layer is provided on the lateral side and underside of the raised portion (Y) blocks 24 and raised portion (X) blocks 25.

The raised portions of the stator 200 include the raised portions (X) 21 and the raised portions (Y) 22. Among the eight regions surrounding each of the recessed portions 23, raised portions (X) 21 are positioned in the two regions that are adjacent in the X direction to the recessed portions 23, and raised portions (Y) 22 are positioned in the six remaining regions. The raised portion (Y) blocks 24 and the raised portion (X) blocks 25 are manufactured by laminating and processing a silicon steel plate and are configured such that magnetic flux can easily pass through in the X direction for blocks 25 and in the Y direction for blocks 24, and the flux leakage to the other direction for each set of blocks is reduced.

The stator 200 according to the second exemplary embodiment can be manufactured more simply than the stator 100 according to the first exemplary embodiment, and similar to the first exemplary embodiment, it has a pass area through which magnetic flux flows in the Y direction. The pass area is twice as large as that of the conventional stator 1. However, the stator 200 according to the second exemplary embodiment has a pass area of magnetic flux in the X direction that is equal to that of the conventional stator 1. The stator 200 according to the second exemplary embodiment is advantageous, for example, for a planar pulse motor which requires thrust mainly in the Y direction.

A stator can also be manufactured in the same manner in which, among the eight regions surrounding each of the recessed portions 23, raised portions (Y) 22 are positioned in the two regions adjacent in the Y direction to the recessed portions 23, and raised portions (X) 21 are positioned in the six remaining regions.

The following modified examples are also possible for the planar pulse motor according to the exemplary embodiments of the present invention.

(1) The stator is arranged by rotating about 45° on the XY plane. As a result, when the mover is transferred in the X and Y directions, the drive thrust can be increased by a factor of √2 by simultaneously driving in the X and Y directions. This is effective for planar linear motors that are frequently driven in only the X or the Y direction.

(2) The mover in the first and second exemplary embodiments can be made the fixed side, and the stator the moving side. More specifically, the mover and stator in the first and second exemplary embodiments are reversed as to their vertical positions, so that a group of tooth tips having a plurality of coils for driving in the X direction and a group of tooth tips having a plurality of coils for driving in the Y direction are lined up and fixed facing upwards. The stator in the first and second exemplary embodiments can be driven above the tooth tips of the stationary mover as a movable stator member.

Exemplary Embodiment of an Exposure Apparatus

Figure 9:
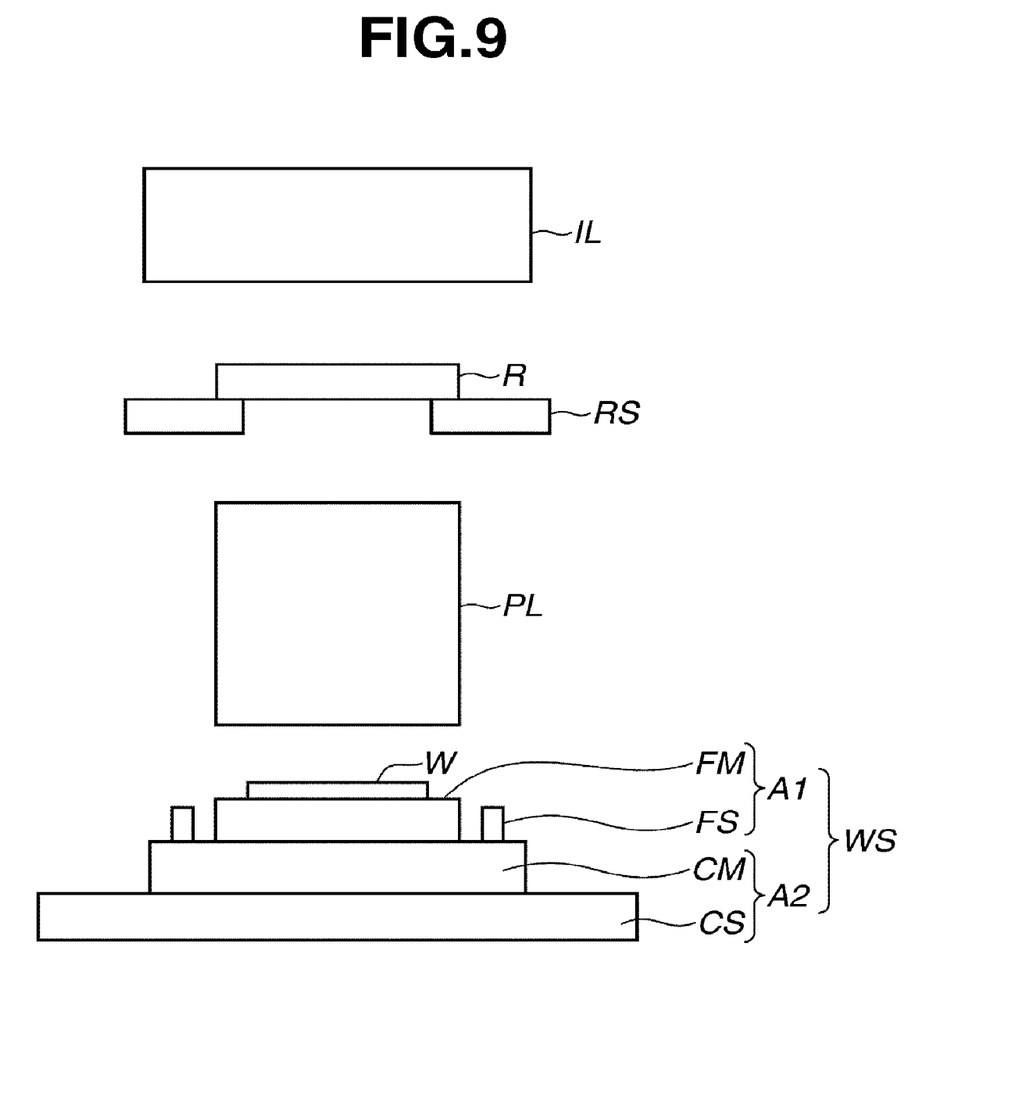
FIG. 9 is a view illustrating the structure of an exposure apparatus.

FIG. 9 is a view illustrating the structure of an exposure apparatus using the planar pulse motor according to the exemplary embodiments of the invention. The exposure apparatus can include a reticle stage RS for positioning an original plate (reticle) R, an illumination optical system IL for illuminating the original plate R, a substrate stage WS for positioning a substrate (wafer) W, and a projection optical system PL for projecting a pattern of the original plate R onto the substrate.

The exposure apparatus is configured so that the pattern of the original plate R is transferred onto the substrate W to form a latent pattern on a photosensitive agent coated on the substrate W. The substrate stage WS is configured to include the above-described planar pulse motor as a drive unit. More specifically, the substrate stage WS can, for example, include a fine movement stage mechanism A1 for positioning the substrate and a coarse motion stage mechanism A2 for positioning the fine movement stage mechanism A1.

The fine movement stage mechanism A1 includes a first mover FM including a substrate chuck for holding the substrate W and a first stator FS. The coarse motion stage mechanism A2 includes a second mover CM for driving the first stator FS and a second stator CS. The coarse motion stage mechanism A2 includes the above-described planar pulse motor as a drive unit. Namely, the second mover CM of the coarse motion stage mechanism A2 includes the above-described mover, and the second stator CS of the coarse motion stage mechanism A2 includes the above-described stator.

The positioning apparatuses, such as the substrate stage WS, are not limited to the components of the exposure apparatus and can be applied in positioning various other objects. Here, the term "positioning apparatus" includes a conveying apparatus for conveying articles.

Exemplary Embodiment of Device Manufacturing

The device (semiconductor integrated circuit device, liquid crystal display element etc.) is manufactured by exposing a substrate (wafer, glass substrate etc.) coated with a photosensitive agent using the exposure apparatus according to the above-described exemplary embodiment, developing the exposed substrate, and other conventional steps including dicing and assembly to produce a finished device.

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures, and functions.

This application claims priority from Japanese Patent Application Nos. 2007-201100 filed Aug. 1, 2007, and 2008-173888 filed Jul. 2, 2008 which are hereby incorporated by reference herein in their entirety.

What is claimed is:

1. A planar pulse motor comprising:
a stator; and
a mover having a plurality of coils which is arranged opposite to the stator,
wherein the planar pulse motor is operable to drive the mover in a plane in first direction and in a second direction, orthogonal to the first direction,
the stator includes a plurality of raised portions, the raised portions comprising at least two different types, the different types being selected from the group consisting of: first raised portions formed by laminating a plurality of layers of members including magnetic materials through which magnetic flux can pass only in the first direction; second raised portions formed by laminating a plurality of layers of members including magnetic materials through which magnetic flux can pass only in the second direction; and third raised portions through which magnetic flux can pass in both the first and second directions, the stator further including a plurality of recessed portions through which magnetic flux cannot pass in either the first or the second direction, and
the plurality of raised portions are regularly arranged next to each of the plurality of recessed portions in the first and second directions.

2. The planar pulse motor according to claim 1,
wherein among eight regions surrounding each of the plurality of recessed portions arranged in a 3×3 array, the first raised portions are positioned in two regions adjacent in the first direction to the recessed portions,
the second raised portions are positioned in two regions adjacent in the second direction, and
the first raised portions, the second raised portions, the third raised portions, and the recessed portions are arranged so that the third raised portions are positioned in four regions corresponding to corners of said array.

3. The planar pulse motor according to claim 2, wherein the stator is an integrated structure in which a plurality of blocks on which the first raised portions are formed in a line and a plurality of blocks on which the second raised portions are formed in a line are fitted into gaps between the raised portions of a structure on which all of the third raised portions to be arranged are formed.

4. The planar pulse motor as claimed in claim 1 in which the first and second raised portions are composed of a plurality of layers laminated together.

5. The planar pulse motor as claimed in claim 1 in which the first and second raised portions include layers of a magnetoresistive material.

6. The planar pulse motor as claimed in claim 1 further comprising a controller configured to control current flowing in said plurality of coils.

7. A stator for use in a planar pulse motor, comprising a plurality of raised portions, the raised portions comprising at least two different types, the different types being selected from the group consisting of: first raised portions composed by laminating a plurality of layers of members including magnetic materials through which magnetic flux can pass only in a first direction; second raised portions composed by laminating a plurality of layers of members including magnetic materials through which magnetic flux can pass only in a second direction orthogonal to said first direction; and third raised portions through which magnetic flux can pass in both the first and second directions, the stator further including a plurality of recessed portions through which magnetic flux cannot pass in either the first or the second direction, and the plurality of raised portions are regularly arranged next to each of the plurality of recessed portions in the first and second directions.

8. An exposure apparatus comprising:
a positioning apparatus which uses a planar pulse motor for positioning at least one of a substrate and a reticle,
the planar pulse motor of the positioning apparatus comprising:
a stator;
a mover having a plurality of coils which is arranged opposite to the stator,
wherein the planar pulse motor is operable to drive the mover with respect to the stator in a plane in a first direction and in a second direction, orthogonal to the first direction, by controlling the current flowing in the plurality of coils,
wherein the stator includes a plurality of raised portions, the raised portions comprising at least two different types, the different types being selected from the group consisting of: first raised portions composed by laminating a plurality of layers of members including magnetic materials through which magnetic flux can pass only in the first direction; second raised portions composed by laminating a plurality of layers of members including magnetic materials through which magnetic flux can pass only in the second direction; and third raised portions through which magnetic flux can pass in both the first and second directions, the stator further including a plurality of recessed portions through which magnetic flux cannot pass in either the first or the second direction,
and wherein the plurality of raised portions are regularly arranged next to each of the plurality of recessed portions in the first and second directions.

9. A planar pulse motor, comprising:
a stator;
a mover having a plurality of coils and arranged opposite to the stator,
wherein the planar pulse motor is operable to drive the mover with respect to the stator in a plane in a first direction and in a second direction, orthogonal to the first direction, by controlling current flowing in the plurality of coils,
wherein the stator includes a plurality of first raised portions composed by laminating a plurality of layers of members including magnetic materials through which magnetic flux can pass only in the first direction, a plurality of second raised portions composed by laminating a plurality of layers of members including magnetic materials through which magnetic flux can pass only in the second direction, a plurality of third raised portions through which magnetic flux can pass in both the first and second directions, and a recessed portion through which magnetic flux cannot pass in either the first or the second direction, and in a vicinity of the recessed portion two of the first raised portions, two of the second raised portions, and four of the third raised portions are arranged adjacent to the recessed portion, and wherein the two first raised portions sandwich the recessed portion in the first direction, the two second raised portions sandwich the recessed portion in the second direction, any two of the four third raised portions sandwich the first raised portions in the second direction, and any two of the four third raised portions sandwich the second raised portions in the first direction.

10. The planar pulse motor according to claim 9, wherein the recessed portion, the first raised portions, the second raised portions, and the third raised portions have an identical cross-sectional profile in a plane parallel to the first and second directions.

11. An exposure apparatus comprising:
a positioning apparatus which uses a planar pulse motor for positioning at least one of a substrate and a reticle,
the planar pulse motor of the positioning apparatus including:
a stator;
a mover having a plurality of coils and being arranged opposite to the stator; and
a controller configured to control current flowing in the plurality of coils,
the planar pulse motor being operable to drive the mover with respect to the stator in a plane in a first direction and in a second direction, orthogonal to the first direction, by controlling current flowing in the plurality of coils,
wherein the stator includes a plurality of first raised portions through which magnetic flux can pass only in the first direction, a plurality of second raised portions through which magnetic flux can pass only in the second direction, a plurality of third raised portions through which magnetic flux can pass in both the first and second directions, and a recessed portion through which magnetic flux cannot pass in either the first or the second direction, and in a vicinity of the recessed portion two of the first raised portions, two of the second raised portions, and four of the third raised portions are arranged adjacent to the recessed portion, and
wherein the two first raised portions sandwich the recessed portion in the first direction, the two second raised portions sandwich the recessed portion in the second direction, any two of the four third raised portions sandwich the first raised portions in the second direction, and any two of the four third raised portions sandwich the second raised portions in the first direction.

* * * * *